US009053724B1

(12) United States Patent
Chahwan et al.

(10) Patent No.: US 9,053,724 B1
(45) Date of Patent: Jun. 9, 2015

(54) DISK DRIVE ACTUATING FIRST HEAD MICROACTUATOR WHILE SENSING SIGNAL FROM SECOND HEAD MICROACTUATOR

(71) Applicant: Western Digital Technologies, Inc., Irvine, CA (US)

(72) Inventors: Alain Chahwan, Irvine, CA (US); Mingji Lou, Corona, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/023,776

(22) Filed: Sep. 11, 2013

Related U.S. Application Data

(60) Provisional application No. 61/867,348, filed on Aug. 19, 2013.

(51) Int. Cl.
*G11B 5/55* (2006.01)
(52) U.S. Cl.
CPC ............ *G11B 5/5526* (2013.01); *G11B 5/5552* (2013.01); *G11B 5/5556* (2013.01); *G11B 5/5547* (2013.01)
(58) Field of Classification Search
CPC .. G11B 5/5556; G11B 5/4813; G11B 5/5552; G11B 5/6058; G11B 5/6076; G11B 5/4873; G11B 5/4826; G11B 5/6011; G11B 5/5547
USPC ........ 360/55, 78.14, 75, 31, 25, 78.05, 294.4, 360/294.3, 125.31, 125.14, 294.7, 77.3
See application file for complete search history.

(56) References Cited

U.S. PATENT DOCUMENTS

| | | | |
|---|---|---|---|
| 6,100,623 A | 8/2000 | Huang et al. | |
| 6,208,489 B1 * | 3/2001 | Marchon | 360/294.7 |
| 6,310,746 B1 | 10/2001 | Hawwa et al. | |
| 6,538,836 B1 * | 3/2003 | Dunfield et al. | 360/75 |
| 6,542,326 B1 | 4/2003 | Ell et al. | |
| 6,583,964 B1 | 6/2003 | Huang et al. | |
| 6,621,653 B1 | 9/2003 | Schirle | |
| 6,697,211 B2 | 2/2004 | Koganezawa | |
| 6,744,577 B1 | 6/2004 | Guo et al. | |
| 6,765,743 B2 * | 7/2004 | Goodman et al. | 360/75 |
| 6,972,924 B1 | 12/2005 | Chen et al. | |
| 7,190,547 B2 * | 3/2007 | Khurshudov et al. | 360/75 |
| 7,218,471 B2 * | 5/2007 | Meyer | 360/75 |
| 7,375,911 B1 | 5/2008 | Li et al. | |
| 7,411,752 B2 | 8/2008 | Angelo et al. | |
| 7,508,634 B2 | 3/2009 | Yao et al. | |
| 7,576,940 B2 * | 8/2009 | Lee et al. | 360/77.02 |
| 7,667,932 B2 * | 2/2010 | Kwon et al. | 360/294.4 |
| 7,804,661 B2 * | 9/2010 | Wilcox et al. | 360/75 |
| 8,144,419 B1 | 3/2012 | Liu | |
| 8,289,659 B1 * | 10/2012 | Bain et al. | 360/294.3 |
| 8,335,049 B1 * | 12/2012 | Liu et al. | 360/78.05 |
| 8,542,458 B2 * | 9/2013 | Matsunaga et al. | 360/77.02 |

* cited by examiner

*Primary Examiner* — Ali Neyzari

(57) ABSTRACT

A disk drive is disclosed comprising a first disk surface and a second disk surface, a first head operable to be positioned over the first disk surface, a second head operable to be positioned over the second disk surface, a first microactuator operable to actuate the first head, and a second microactuator operable to actuate the second head. The first head is actuated over the first disk surface using the first microactuator while processing a second sensor signal generated by the second microactuator, and the second head is actuated over the second disk surface using the second microactuator while processing a first sensor signal generated by the first microactuator.

16 Claims, 5 Drawing Sheets

ABORT WRITE (FIG. 3B)
GENERATE FEED-FORWARD COMPENSATION (FIG. 3C)
ADAPT FEEDBACK COMPENSATOR (FIG. 3D)
COMPENSATE VIBRATION MODE (FIG. 3E)
ETC.

DISK DRIVE ACTUATING FIRST HEAD MICROACTUATOR WHILE SENSING SIGNAL FROM SECOND HEAD MICROACTUATOR

CROSS-REFERENCE TO RELATED APPLICATIONS

This application claims priority to provisional U.S. Patent Application Ser. No. 61/867,348, filed on Aug. 19, 2013, which is hereby incorporated by reference in its entirety.

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

DETAILED DESCRIPTION

Figure 1:
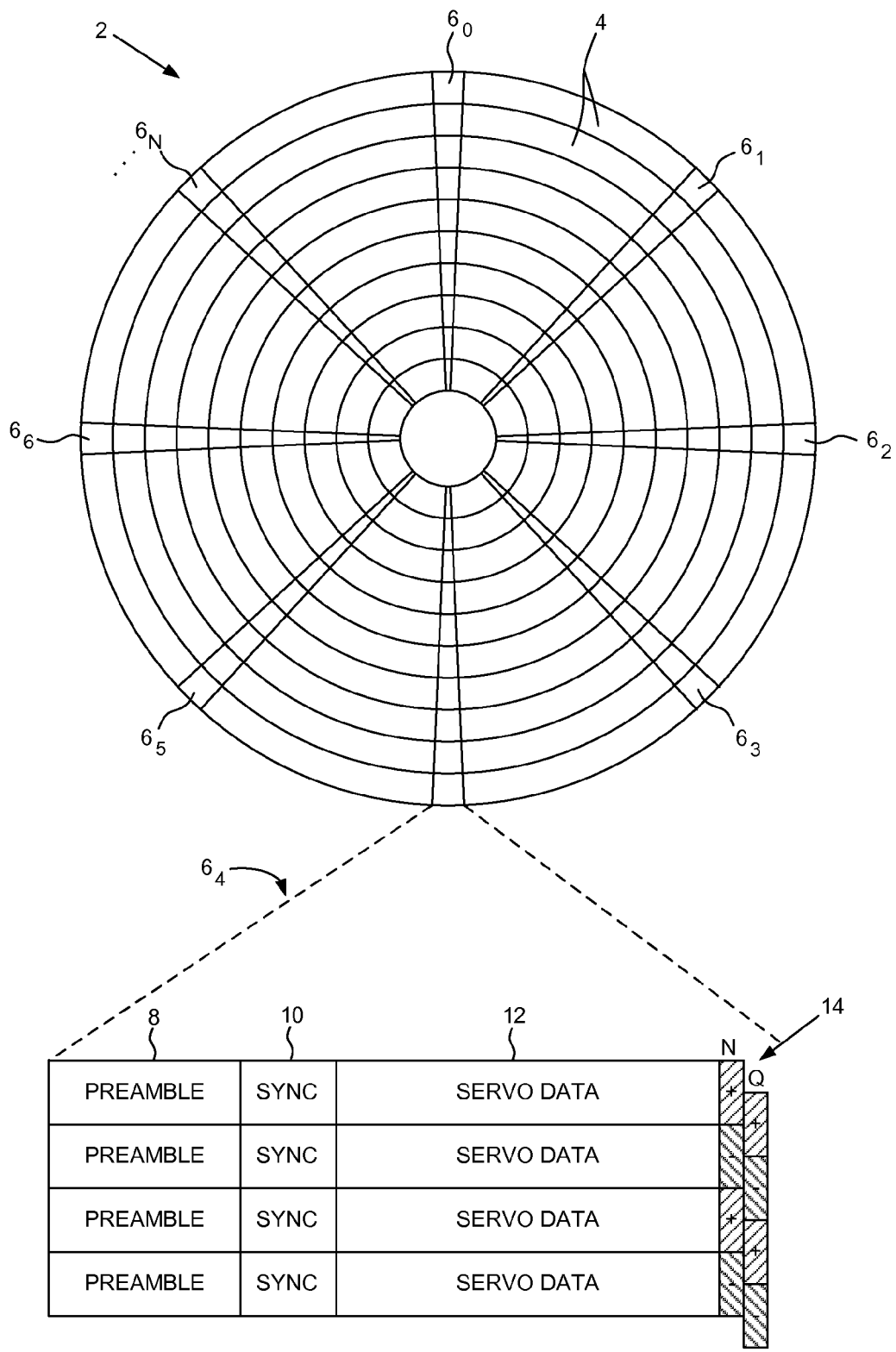
FIG. 1 shows a prior art disk format comprising a plurality of servo tracks defined by servo sectors.
Figure 2A:
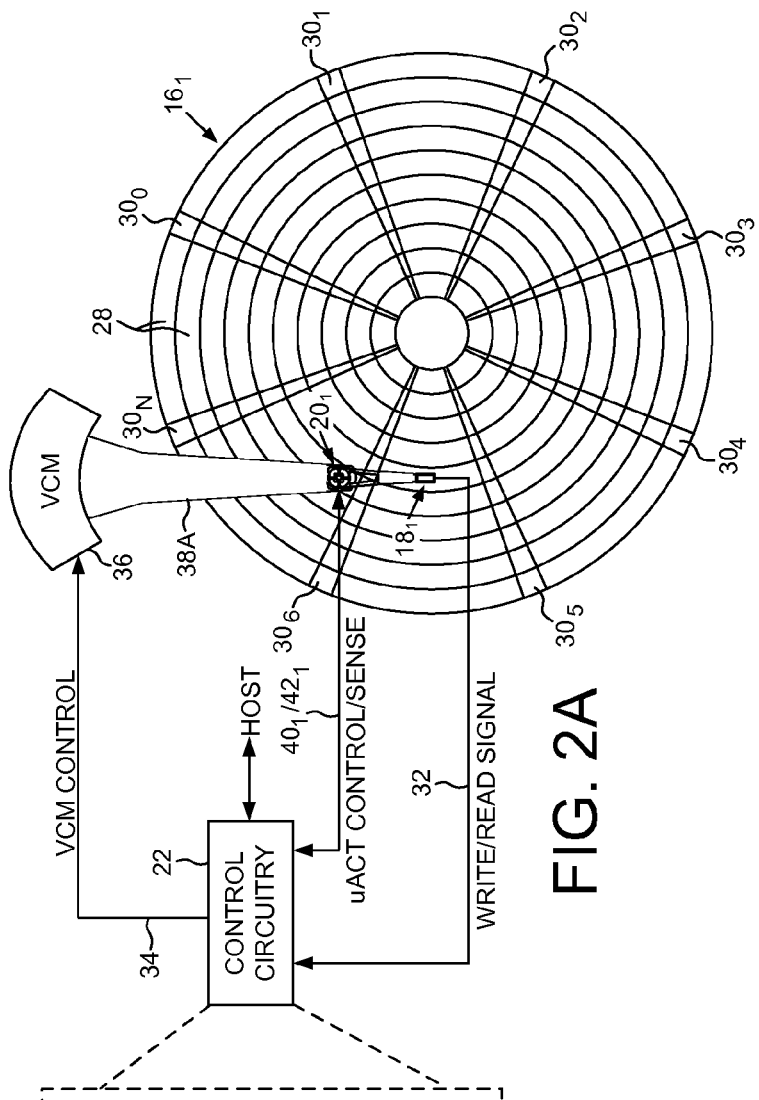
FIGS. 2A and 2B show a disk drive according to an embodiment comprising a plurality of disk surfaces and a head actuated over each disk surface using a microactuator.
Figure 2B:
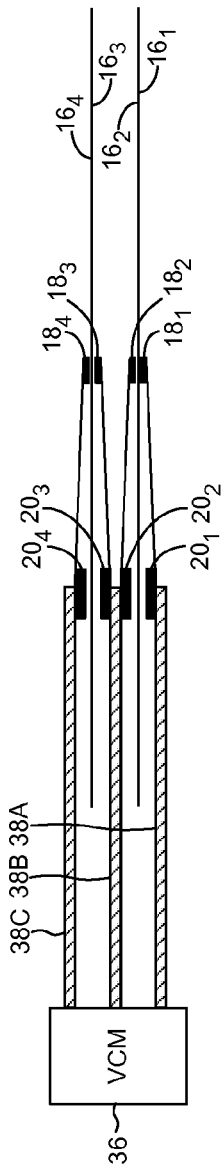
Figure 2C:
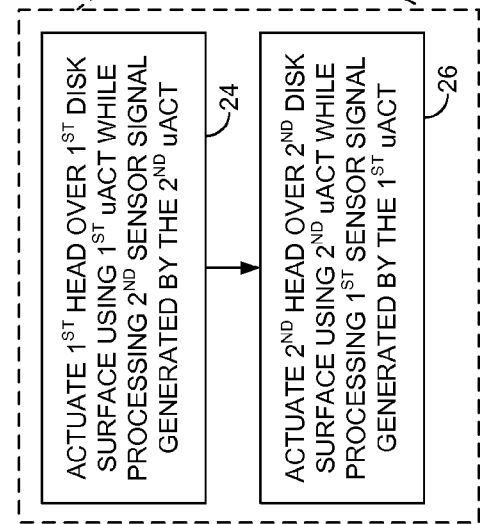
FIG. 2C is a flow diagram according to an embodiment wherein when actuating a first head over a first disk surface using a first microactuator, a sensor signal generated by a second microactuator is processed.

FIGS. 2A and 2B show a disk drive according to an embodiment comprising a first disk surface $16_1$ and a second disk surface $16_2$. A first head $18_1$ is operable to be positioned over the first disk surface $16_1$, and a second head $18_2$ is operable to be positioned over the second disk surface $16_2$. A first microactuator $20_1$ is operable to actuate the first head $18_1$, and a second microactuator $20_2$ is operable to actuate the second head $18_2$. The disk drive further comprises control circuitry 22 operable to execute the flow diagram of FIG. 2C, wherein the first head is actuated over the first disk surface using the first microactuator while processing a second sensor signal generated by the second microactuator (block 24). The second head is actuated over the second disk surface using the second microactuator while processing a first sensor signal generated by the first microactuator (block 26).

In the embodiment of FIG. 2A, the first disk surface $16_1$ comprises a plurality of servo tracks 28 defined by servo sectors $30_0$-$30_N$, wherein data tracks are defined relative to the servo tracks 28 at the same or different radial density. The control circuitry 22 processes a read signal 32 emanating from the first head $18_1$ to demodulate the servo sectors $30_0$-$30_N$ and generate a position error signal (PES) representing an error between the actual position of the head and a target position relative to a target track. The control circuitry 22 filters the PES using a suitable compensation filter to generate a control signal 34 applied to a voice coil motor (VCM) 36 which rotates an actuator arm 38A about a pivot in order to actuate the first head $18_1$ radially over the first disk surface $16_1$ in a direction that reduces the PES. The control circuitry 22 may generate a control signal $40_1$ applied to the first microactuator $20_1$ in order to actuate the first head $18_1$ over the first disk surface $16_1$ in fine movements, or the control circuitry 22 may process a sensor signal $42_1$ generated by the first microactuator $20_1$ when the first head $18_1$ is not the active head. The servo sectors $30_0$-$30_N$ may comprise any suitable head position information, such as a track address for coarse positioning and servo bursts for fine positioning. The servo bursts may comprise any suitable pattern, such as an amplitude based servo pattern or a phase based servo pattern.

Any suitable microactuator 20 may be employed in the different embodiments, such as a suitable piezoelectric element or a suitable thermal element. Further, the microactuator 20 may actuate the head over the respective disk surface in any suitable manner, such as by actuating a suspension relative to the actuator arm as in FIG. 2A, or by actuating a slider relative to the suspension. When the microactuator 20 of an inactive head is not being driven during an access operation, it may act as a transducer that generates a suitable sensor signal indicative of movement, such as a shock or vibration affecting the disk drive.

Figure 3A:
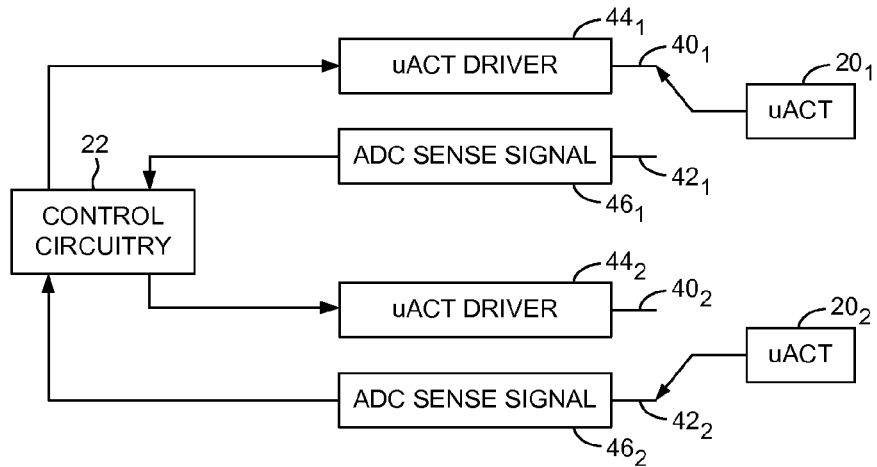
FIG. 3A shows an embodiment wherein a first and second microactuator are configurable to either actuate a head over a respective disk surface or generate a sensor signal.

FIG. 3A shows an embodiment wherein the control circuitry 22 applies the control signal $40_1$ to the first microactuator $20_1$ through a microactuator driver $44_1$ and may simultaneously process the sensor signal $42_2$ generated by the second microactuator $20_2$ of the second (inactive) head $18_2$ (and/or the microactuator sensor signal of another inactive head). In the embodiment of FIG. 3A, the sensor signal $42_2$ is sampled using a suitable analog-to-digital converter (ADC) $46_2$ and the sampled values processed by the control circuitry 22. For example, in one embodiment the control circuitry 22 may be accessing the first disk surface $16_1$ during a write operation while simultaneously processing the sensor signal $42_2$ generated by the second microactuator $20_2$ of the second (inactive) head $18_2$. As described in greater detail below, the control circuitry 22 may respond to the sensor signal $42_2$ in any suitable manner, such as by aborting the write operation when a shock is detected, and/or generate feed-forward compensation used to servo the first head $18_1$ when a vibration is detected, etc. During a write operation to the second disk surface $16_2$, the control circuitry 22 applies the control signal $40_2$ to the second microactuator $20_2$ through a microactuator driver $44_2$ and may simultaneously process the sensor signal $42_1$ generated by the first microactuator $20_1$ of the first (inactive) head $18_1$ (and/or the microactuator sensor signal of another inactive head). In this manner during access operations to a first disk surface, the sensor signal generated by one or more microactuators of the inactive heads may be simultaneously processed to improve the performance of the disk drive.

Figure 3B:
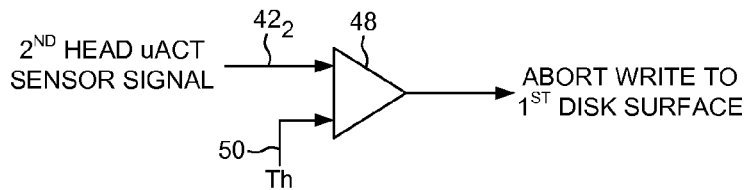
FIG. 3B shows an embodiment wherein the sensor signal generated by a microactuator may be used to abort a write operation.

The sensor signal generated by one or more microactuators of the inactive heads may be processed in any suitable manner. FIG. 3B shows an embodiment wherein when writing data to the first disk surface $16_1$ through the first head $18_1$, the sensor signal $42_2$ generated by the second microactuator $20_2$ may be simultaneously compared 48 to a threshold 50. If the sensor signal $42_2$ exceeds the threshold 50, a shock event may be detected and the write operation to the first disk surface $16_1$ may be aborted.

Figure 3C:
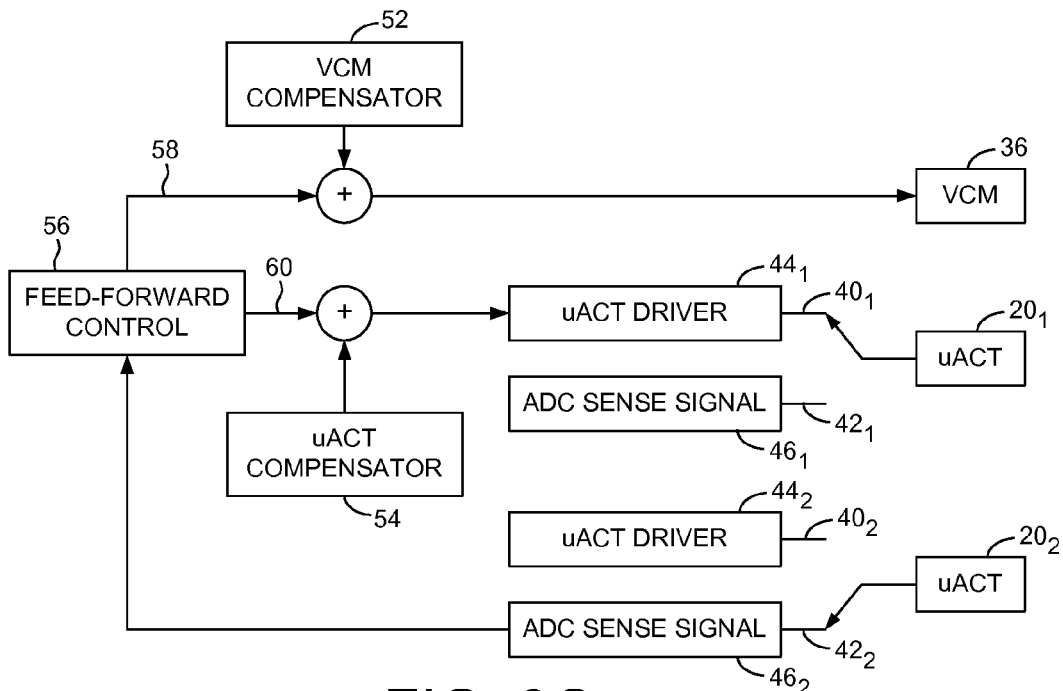
FIG. 3C shows an embodiment wherein the sensor signal generated by a second microactuator may be used to generate feed-forward compensation for controlling a first microactuator.

FIG. 3C shows an embodiment of a dual stage servo control system comprising a VCM compensator 52 and a microactuator compensator 54. In one embodiment, the compensators 52 and 54 generate respective control signals by signal processing (e.g., filtering) the PES generated from reading the servo sectors $30_0$-$30_N$. Accordingly, the PES is processed as part of a feedback loop. When the disk drive is subjected to a vibration, in the embodiment of FIG. 3C the sensor signal $42_2$ may be processed at control block 56 to generate a feed-forward compensation value. For example, a feed-forward compensation value 58 may be added to the output of the VCM compensator 52 and/or a feed-forward compensation value 60 may be added to the output of the microactuator compensator 54. The feed-forward compensation value may help compensate for a vibration so that the effect is canceled from the feedback loop by reducing the affect on the PES.

Figure 3D:
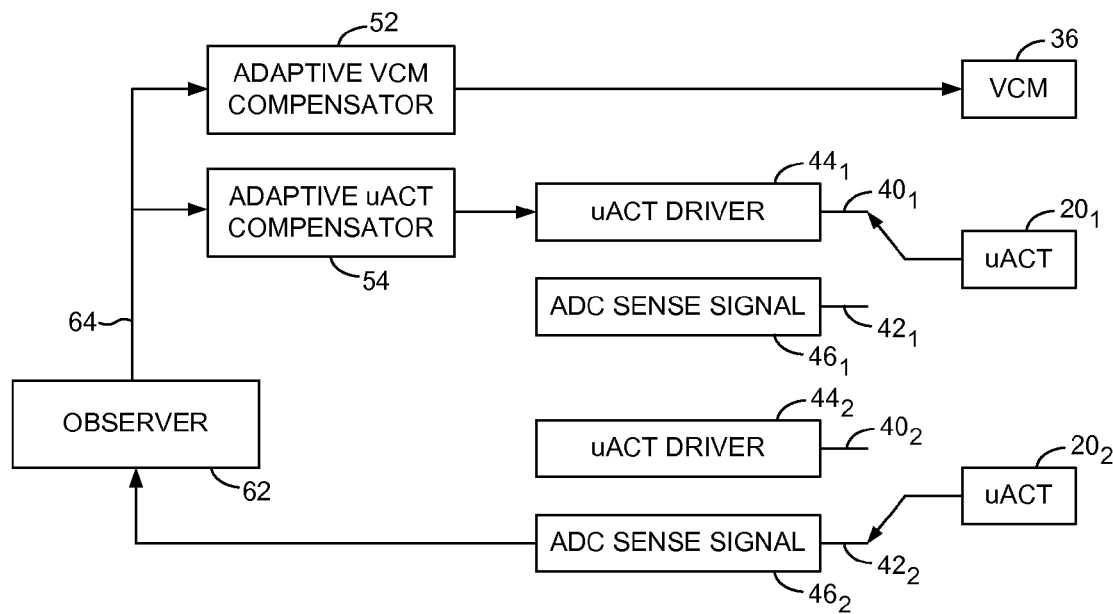
FIG. 3D shows an embodiment wherein at least one of a VCM compensator and a microactuator compensator may be adapted based on the sensor signal generated by a microactuator.

FIG. 3D shows an embodiment wherein at least one of the VCM compensator 52 and the microactuator compensator 54 is adapted based on the second sensor signal $42_2$, wherein the first head is actuated over the first disk surface based on a feedback control signal generated by at least one of the VCM compensator and the microactuator compensator. In the embodiment of FIG. 3D, the control circuitry comprises an observer 62 that evaluates the second sensor signal $42_2$, for example, to identify a frequency of a vibration affecting the disk drive. The observer 62 generates a suitable configuration signal 64 that adapts one or both of the VCM compensator 52 and the microactuator compensator 54, for example, by increasing a gain of the compensation algorithm near the observed frequency of the vibration. In one embodiment, one or both of the compensators may be adapted over time as the magnitude and/or frequency of the vibrations affecting the disk drive change over time.

Figure 3E:
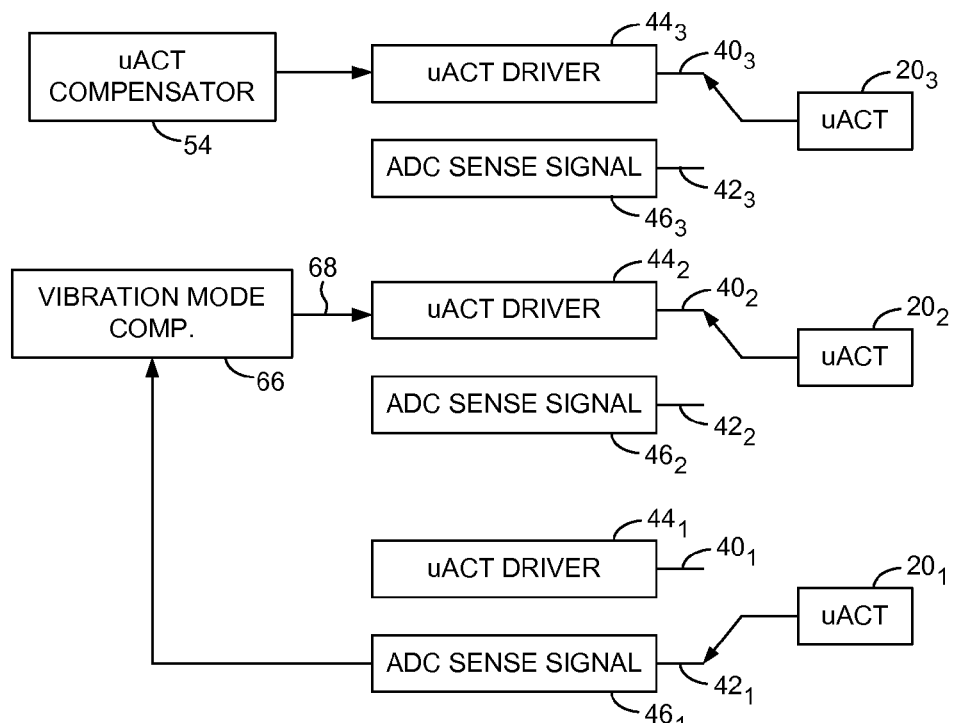
FIG. 3E shows an embodiment wherein while servoing a first head over a first disk surface using a first microactuator, a third microactuator may be driven in response to the sensor signal generated by the second microactuator in order to compensate for a vibration mode.

FIG. 3E shows an embodiment wherein block 66 of the control circuitry generates a control signal 68 applied to a third microactuator $20_2$ based on a second sensor signal $42_1$ while actuating a first head $18_3$ over a first disk surface $16_3$ using a first microactuator $20_3$. This embodiment may help compensate for a vibration mode of the actuator arm of the active head. An example of this embodiment may be understood with reference again to FIG. 2B, wherein actuating a first head $18_3$ over a first disk surface $16_3$ using a first microactuator $20_3$ may excite a vibration mode of the corresponding actuator arm 38B. In one embodiment, the vibration mode may be detected by evaluating a second sensor signal $42_1$ generated by a second microactuator $20_1$ in order to generate a control signal 68 applied to a third microactuator $20_2$ that helps compensate for the vibration mode. In this embodiment, the third microactuator $20_2$ is coupled to the same actuator arm 38B as the first microactuator $20_3$ so that the vibration induced by driving the first microactuator $20_3$ may be counteracted by appropriately driving the third microactuator $20_2$ using the control signal 68.

Figure 4A:
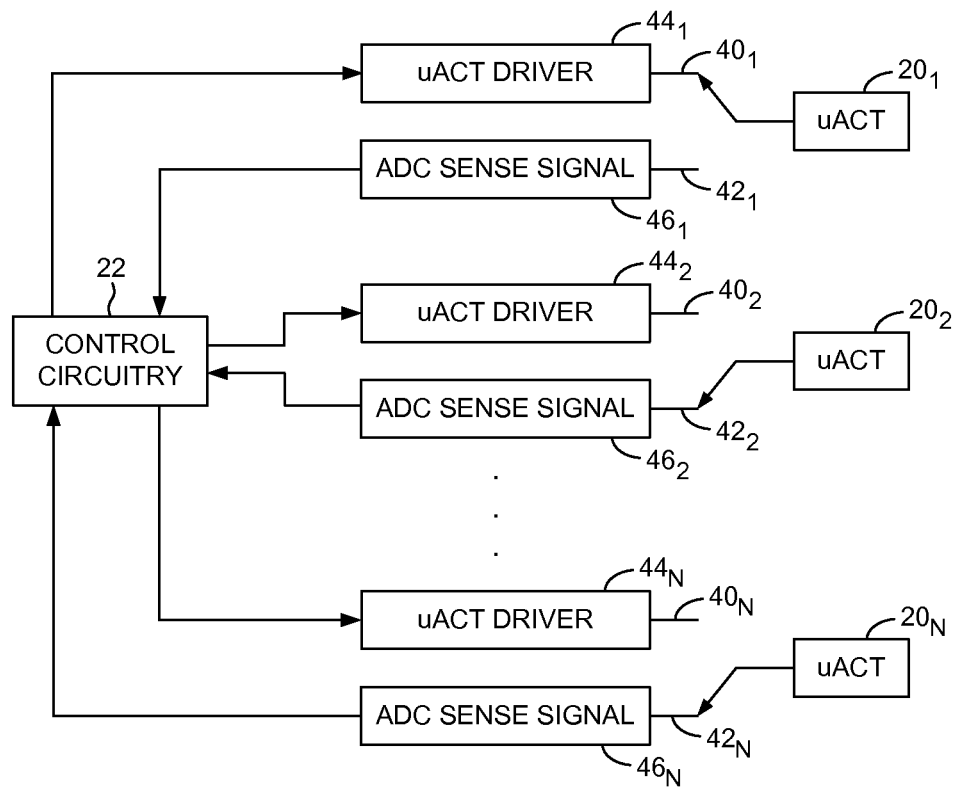
FIGS. 4A and 4B shows an embodiment where the sensor signal generated by multiple microactuators may be processed, for example, to abort a write operation, generate feed-forward compensation, adapt a feedback compensator, compensate for a vibration mode, etc.
Figure 4B:
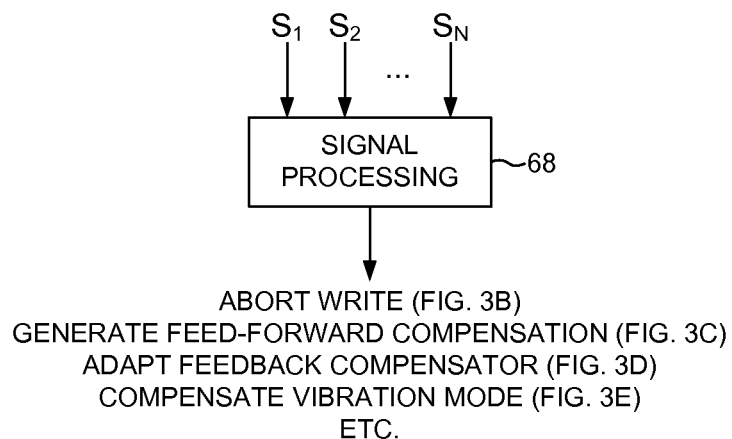

FIG. 4A shows an embodiment wherein the control circuitry 22 may process the sensor signal $42_2$-$42_N$ generated by multiple microactuators $20_2$-$20_N$ of multiple inactive heads while actuating the first head over the first disk surface using the first microactuator $20_1$. As shown in FIG. 4B, the sensor signals $S_1$-$S_N$ may be processed using any suitable signal processing algorithm 68, such as an algorithm that averages the sensor signals to thereby attenuate the noise and generate a more accurate representation of a shock or vibration affecting the disk drive. In one embodiment, the signal processing algorithm 68 may measure a difference between the sensor signals.

Referring again to FIG. 2B, the control circuitry 22 may process the sensor signal generated by the microactuator of any one (or more) of the inactive heads. In one embodiment, the control circuitry 22 may select the microactuator that is coupled to the same arm as the microactuator driving the active head. For example, while servoing the third head $18_3$ over the third disk surface $16_3$ using the third microactuator $20_3$, the control circuitry 22 may process the sensor signal generated by the second microactuator $20_2$ which is coupled to the same actuator arm 38B as the third microactuator $20_3$. This embodiment may provide a better indication of a vibration mode of a particular actuator arm, and thereby generate a more accurate representation of the disturbance affecting the third head $18_3$. In another embodiment, the control circuitry 22 may process the sensor signal generated by a microactuator coupled to a different actuator arm from the actuator arm driving the active head. For example, the control circuitry 22 may process the sensor signal generated by the first microactuator $20_1$ while servoing the third head $18_3$ over the third disk surface $16_3$ using the third microactuator $20_3$. This embodiment may provide a more accurate representation of a shock event affecting the disk drive as it may be less affected by the vibrations induced by the microactuator driving the active head. In one embodiment, the control circuitry may process the sensor signal generated by a first microactuator in order to generate vibration compensation (e.g., feed-forward compensation), and simultaneously process the sensor signal generated by a second microactuator in order to detect a shock event and abort a write operation.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A disk drive comprising:
   a first disk surface, a second disk surface, and a third disk surface;
   a first head operable to be positioned over the first disk surface;
   a second head operable to be positioned over the second disk surface;
   a third head operable to be positioned over the third disk surface;
   a first microactuator operable to actuate the first head;
   a second microactuator operable to actuate the second head;
   a third microactuator operable to actuate the third head over the third disk surface; and
   control circuitry operable to:
      actuate the first head over the first disk surface using the first microactuator while processing a second sensor signal generated by the second microactuator and while processing a third sensor signal generated by the third microactuator;
      write data to the first disk surface while actuating the first head over the first disk surface; and
      abort the write based on the second sensor signal and the third sensor signal.

2. The disk drive as recited in claim 1, wherein the control circuitry is further operable to:
   generate a feed-forward compensation value based on the second sensor signal and the third sensor signal; and
   actuate the first head over the first disk surface based on the feed-forward compensation value.

3. The disk drive as recited in claim 1, wherein the control circuitry is further operable to:
   adapt at least one of a VCM compensator and a microactuator compensator based on the second sensor signal and the third sensor signal; and
   actuate the first head over the first disk surface based on a feedback control signal generated by at least one of the VCM compensator and the microactuator compensator.

4. The disk drive as recited in claim 1, wherein:
   the first head is coupled to a first actuator arm; and
   the second head is coupled to the first actuator arm.

5. The disk drive as recited in claim 1, wherein:
   the first head is coupled to a first actuator arm; and
   the second head is coupled to a second actuator arm.

6. A method of operating a disk drive comprising:
   actuating a first head over a first disk surface using a first microactuator while processing a second sensor signal generated by a second microactuator and while processing a third sensor signal generated by a third microactuator;
   writing data to the first disk surface while actuating the first head over the first disk surface; and
   aborting the write based on the second sensor signal and the third sensor signal.

7. The method as recited in claim 6, further comprising:
   generating a feed-forward compensation value based on the second sensor signal and the third sensor signal; and
   actuating the first head over the first disk surface based on the feed-forward compensation value.

8. The method as recited in claim 6, further comprising:
   adapting at least one of a VCM compensator and a microactuator compensator based on the second sensor signal and the third sensor signal; and
   actuating the first head over the first disk surface based on a feedback control signal generated by at least one of the VCM compensator and the microactuator compensator.

9. The method as recited in claim 6, further comprising actuating a second head over a second disk surface using the second microactuator, wherein:
   the first head is coupled to a first actuator arm; and
   the second head is coupled to the first actuator arm.

10. The method as recited in claim 6, further comprising actuating a second head over a second disk surface using the second microactuator, wherein:
    the first head is coupled to a first actuator arm; and
    the second head is coupled to a second actuator arm.

11. A disk drive comprising:
a first disk surface and a second disk surface;
a first head operable to be positioned over the first disk surface;
a second head operable to be positioned over the second disk surface;
a first microactuator operable to actuate the first head;
a second microactuator operable to actuate the second head; and
control circuitry operable to:
  actuate the first head over the first disk surface using the first microactuator while processing a sensor signal generated by the second microactuator;
  adapt at least one of a VCM compensator and a microactuator compensator based on the sensor signal; and
  actuate the first head over the first disk surface based on a feedback control signal generated by at least one of the VCM compensator and the microactuator compensator.

12. A disk drive comprising:
a first disk surface, a second disk surface, and a third disk surface;
a first head operable to be positioned over the first disk surface;
a second head operable to be positioned over the second disk surface;
a third head operable to be positioned over the third disk surface;
a first microactuator operable to actuate the first head;
a second microactuator operable to actuate the second head;
a third microactuator operable to actuate the third head over the third disk surface; and
control circuitry operable to actuate the first head over the first disk surface using the first microactuator while applying a control signal to the third microactuator based on a sensor signal generated by the second microactuator.

13. A method of operating a disk drive, the method comprising:
actuating a first head over a first disk surface using a first microactuator while processing a sensor signal generated by a second microactuator;
adapting at least one of a VCM compensator and a microactuator compensator based on the sensor signal; and
actuating the first head over the first disk surface based on a feedback control signal generated by at least one of the VCM compensator and the microactuator compensator.

14. A method of operating a disk drive, the method comprising actuating a first head over a first disk surface using a first microactuator while applying a control signal to a third microactuator based on a sensor signal generated by a second microactuator.

15. A disk drive comprising:
a first disk surface, a second disk surface, and a third disk surface;
a first head operable to be positioned over the first disk surface;
a second head operable to be positioned over the second disk surface;
a third head operable to be positioned over the third disk surface;
a first microactuator operable to actuate the first head;
a second microactuator operable to actuate the second head;
a third microactuator operable to actuate the third head over the third disk surface; and
control circuitry operable to:
  actuate the first head over the first disk surface using the first microactuator while processing a second sensor signal generated by the second microactuator and while processing a third sensor signal generated by the third microactuator;
  generate a feed-forward compensation value based on the second sensor signal and the third sensor signal; and
  actuate the first head over the first disk surface based on the feed-forward compensation value.

16. A method of operating a disk drive comprising:
actuating a first head over a first disk surface using a first microactuator while processing a second sensor signal generated by a second microactuator and while processing a third sensor signal generated by a third microactuator;
generating a feed-forward compensation value based on the second sensor signal and the third sensor signal; and
actuating the first head over the first disk surface based on the feed-forward compensation value.

* * * * *